(12) United States Patent
Short

(10) Patent No.: US 7,784,157 B1
(45) Date of Patent: Aug. 31, 2010

(54) APPARATUS TO RETAIN A COIL WIRE FROM A MICROPHONE TO PREVENT THE MICROPHONE FROM FALLING AWAY FROM A PERSON

(75) Inventor: Michael Short, Van Nuys, CA (US);
Michelle D. Short, legal representative, Van Nuys, CA (US)

(73) Assignee: MTS 911 Wear Inc., Oxnard, CA (US)

( * ) Notice: Subject to any disclaimer, the term of this patent is extended or adjusted under 35 U.S.C. 154(b) by 389 days.

(21) Appl. No.: 11/888,948

(22) Filed: Aug. 3, 2007

(51) Int. Cl.
*A45F 5/00* (2006.01)

(52) U.S. Cl. .............................. 24/3.13; 2/69; 224/182; 224/250; 224/254

(58) Field of Classification Search ............ 24/66.2, 24/265 EC, 265 BC, 265 H, 573.09; 132/273, 132/275; 2/69; 224/182, 250, 254
See application file for complete search history.

(56) References Cited

U.S. PATENT DOCUMENTS

| | | | |
|---|---|---|---|
| RE30,701 E | * | 8/1981 | Williams et al. ............ 24/114.8 |
| 5,577,395 A | | 11/1996 | Kuykendall |
| 5,669,119 A | * | 9/1997 | Seron ......................... 24/265 H |
| 5,671,508 A | * | 9/1997 | Murai ......................... 24/115 K |
| 5,752,632 A | * | 5/1998 | Sanderson et al. ............ 224/182 |
| 6,044,527 A | | 4/2000 | Ishida et al. |
| 6,105,218 A | | 8/2000 | Rekkie |
| 6,389,659 B1 | * | 5/2002 | Jacobs ....................... 24/573.09 |
| 6,401,309 B1 | * | 6/2002 | Yang ............................ 24/130 |
| 6,526,635 B2 | | 3/2003 | Nasu et al. |
| D505,673 S | | 5/2005 | Montemayor |
| 2005/0076482 A1 | | 4/2005 | Costa |

* cited by examiner

*Primary Examiner*—Robert J Sandy
*Assistant Examiner*—Michael Lee
(74) *Attorney, Agent, or Firm*—Thomas I. Rozsa

(57) ABSTRACT

An apparatus which facilitates retaining a coil wire from a microphone onto a shirt. The device is used to retain the coil from a microphone to a location adjacent to a police officer's shirt. The microphone or other communication device has an alligator clip or other means by which it is clipped to a shirt. The microphone is attached to a coil which then is attached to a pack which is usually worn on the police officer's belt. The present invention provides a secure loop which is securely retained on the shirt and through which the microphone coil passes. As a result, when the microphone becomes dislodged, the loop provides a means by which the coil dangles from the loop and enables the microphone to remain adjacent to the police officer's shirt.

7 Claims, 4 Drawing Sheets

APPARATUS TO RETAIN A COIL WIRE FROM A MICROPHONE TO PREVENT THE MICROPHONE FROM FALLING AWAY FROM A PERSON

BACKGROUND OF THE INVENTION

1. Field of the Invention

The present invention relates in general to the field of devices which assist in retaining an object at a location adjacent an item of wearing apparel so that the object will remain close to the person while the item of wearing apparel is worn.

2. Description of the Prior Art

In general, an apparatus which assists in retaining an object close to an item of wearing apparel is known in the prior art. The following 10 patents and published patent applications are relevant to the field of the present invention:

1. U.S. Pat. No. 5,577,395 issued to Dennis G. Kuykendall and assigned to Scovill Fasteners Inc. on Nov. 26, 1996 for "Clip For An Identification Bracelet" (hereafter the "Kuykendall Patent");

2. U.S. Pat. No. 6,044,527 issued to Tomohisa Ishida et al. and assigned to YKK Corporation on Apr. 4, 2000 for "Cord End Stopper" (hereafter the "Ishida Patent");

3. U.S. Pat. No. 6,105,218 issued to George Rekkie and assigned to Siemens Medical Systems, Inc. on Aug. 22, 2000 for "Snap-Type Fastening Device" (hereafter the "Reekie Patent");

4. U.S. Pat. No. 6,526,635 issued to Koji Nasu et al. and assigned to Hosiden Corporation on Mar. 4, 2003 for "Cord Clip" (hereafter the "Nasu Patent");

5. U.S. Published Patent Application No. 2005/0076482 to Emilio Costa on Apr. 14, 2005 for "Reusable Seal Applicable To A Slender Portion Of A Commercial Article" (hereafter the "Costa Published Patent Application");

6. U.S. Design Patent No. D505,673 issued to Lionel Montemayor on May 31, 2005 for "Radio Microphone Holder" (hereafter the "Montemayor Design Patent");

7. European Patent Application No. EP 0848187 issued to Tomohisa Ishida et al. and assigned to YKK Corporation on Jun. 17, 1998 for "Cord End Stopper" (hereafter the "'187 Ishida European Patent");

8. European Patent Application No. EP 0945646 issued to Tomohisa Ishida et al. and assigned to YKK Corporation on Sep. 29, 1999 for "Cord End Stopper (hereafter the "'646 Ishida European Patent");

9. European Patent Application No. EP 0945647 issued to Tomohisa Ishida et al. and assigned to YKK Corporation on Sep. 29, 1999 for "Cord End Stopper" (hereafter the "'647 Ishida European Patent");

10. Patent Abstract of Japan No. 10174607A issued to Nozawa Massao et al. and assigned to YKK Corporation on Jun. 30, 1998 for "Cord End Fastening Device" (hereafter the "Massao Patent Abstract of Japan").

The Kuykendall Patent is a clip for an identification bracelet which discloses prongs and mating openings into which a clip is attached so it can be attached around an arm.

The Ishida Patent also is for a comparable type of retaining mechanism with mating groove members as best shown in FIG. 1 which basically interlock to retain an object therein.

The Reckie Patent discloses the concept of having a clip member which can have a method to attach and grip a flexible tube so that the clip member can be attached to a portion of a patient's garment and the flexible tube can be used to form a loop as best shown in FIG. 4 so that items such as an IV tube, etc. can be retained within the loop so that it will not become loosened from the patient. The clip member attaches to the patient's garment and the loop member can retain an IV tube within the loop.

The Nasu Patent is a cord clip which has a clipping portion as best illustrated in FIG. 1 which can be used to be clipped to an article of clothing and a cord retaining portion 3 best illustrated in FIG. 2 showing the cord so that the device enables it to be clipped to an article of clothing and then a cord member extending through the device so that the cord member can be used for earphones or other related accessories.

The Costa Published Patent Application discloses a ceiling member which has a pair of plates disclosed in FIGS. 1 and 2 which can be rotated about each other so that there are respective mating teeth which engage to therefore hold the plate together so that it can retain a slender object between the plates.

The Montemayor Design Patent is called a "Radio Microphone Holder".

The European Patent to YKK Corporation and Masao is once again a clipping device comparable to the device that was shown in the Ishida Patent. It essentially is designed to retain objects together by having mating gripping teeth.

Similarly, the '644 European Patent to Ishida is comparable to the United States Patent discussed above which has the same attaching mechanism.

The '647 European Patent to Ishida is also a variation on the gripping member.

The Japanese Patent abstract to Nozawa Masao is essentially the Japanese equivalent of the European applications discussed above with a clipping member.

SUMMARY OF THE INVENTION

The present invention is an apparatus which facilitates retaining a coil wire from a microphone onto a shirt. This is particularly beneficial for use by a police officer. The device is used to retain the coil from a microphone to a location adjacent to the police officer's shirt. The microphone or other communication device has an alligator clip or other means by which it is clipped to a shirt. The microphone is attached to a coil which then is attached to a transmission pack which is usually worn on the police officer's belt. When a police officer is chasing a felon or is involved in a scuffle with a felon, it is easy for the microphone to be dislodged from where it is clipped to the shirt and will fall away from the officer and frequently falls on the ground. There is a significant need to provide an apparatus which will enable the microphone to remain adjacent the police officer's shirt in the location of the police officer's chest area after the microphone becomes dislodged. The present invention addresses this need by providing a secure loop which is securely retained on the shirt and through which the microphone coil passes. As a result, when the microphone becomes dislodged, the loop provides a means by which the coil dangles from the loop and enables the microphone to remain adjacent to the police officer's shirt at a location near the police officer's chest.

It has been discovered, according to the present invention, that if an elastic cord is affixed at two ends to a wide base so that the elastic cord forms a closed loop with the base, and if the elastic cord is fitted through a buttonhole of a shirt so that the loop extends in front of the shirt while the wide base is behind the button hole to securely retain the elastic loop onto the shirt, then if the coil of a microphone is passed through the elastic cord, the elastic cord will facilitate having the microphone and its coil dangle adjacent to the shirt if the microphone becomes dislodged from the shirt.

It has further been discovered, according to the present invention, that if the elastic cord is affixed into the wide base through teeth within the base which grip into the ends of the elastic cord, then the elastic cord will be securely retained within the base to thereby provide greater security to assure that the microphone coil will dangle adjacent the shirt if the microphone should become dislodged.

It is therefore an object of the present invention to provide an elastic cord which is affixed at two ends to a wide base so that the elastic cord forms a closed loop, so that the elastic cord can be fitted through a buttonhole of a shirt so that the loop extends in front of the shirt while the wide base is behind the buttonhole to securely retain the elastic loop onto the shirt, so that if the coil of a microphone is passed through the elastic cord, the elastic cord will facilitate having the microphone and its coil dangle adjacent to the shirt if the microphone becomes dislodged from the shirt.

It is a further object of the present invention to provide an elastic cord which is affixed into the wide base through teeth within the base which grip into the ends of the elastic cord, so that the elastic cord will be securely retained within the base to thereby provide greater security to assure that the microphone coil will dangle adjacent the shirt if the microphone should become dislodged.

Further novel features and other objects of the present invention will become apparent from the following detailed description, discussion and the appended claims, taken in conjunction with the drawings.

BRIEF DESCRIPTION OF THE DRAWINGS

Referring particularly to the drawings for the purpose of illustration only and not limitation, there is illustrated.

DETAILED DESCRIPTION OF THE PREFERRED EMBODIMENTS

Although specific embodiments of the present invention will now be described with reference to the drawings, it should be understood that such embodiments are by way of example only and merely illustrative of but a small number of the many possible specific embodiments which can represent applications of the principles of the present invention. Various changes and modifications obvious to one skilled in the art to which the present invention pertains are deemed to be within the spirit, scope and contemplation of the present invention as further defined in the appended claims.

Figure 1:
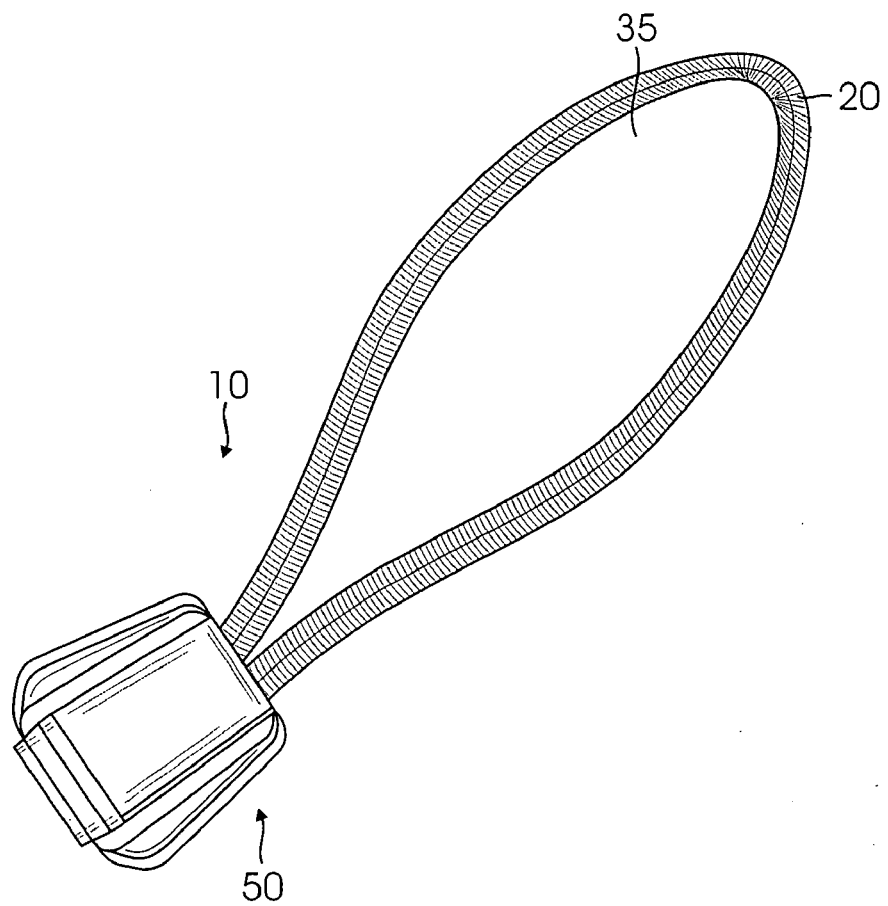
FIG. 1 is a perspective view of the present invention elastic cord retained within a wide base.
Figure 2:
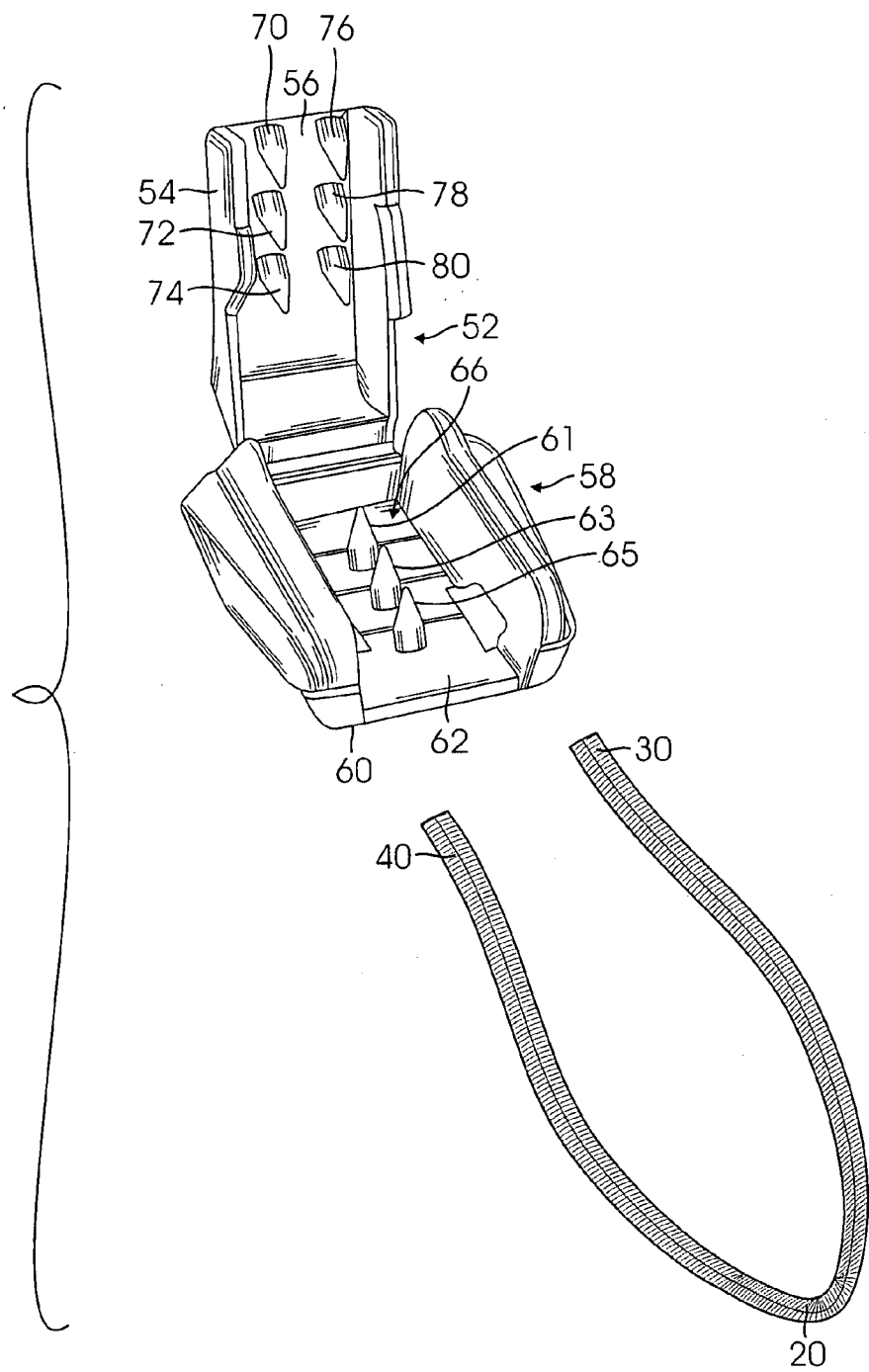
FIG. 2 is an exploded view of the present invention illustrating the wide base in the open condition to expose the gripping teeth within the wide base.

Referring particularly to FIGS. 1 and 2, there is illustrated the present invention coil retaining apparatus 10 which is comprised of an elastic cord 20 having two ends 30 and 40 which are retained within a wide base member 50 to thereby form a closed loop 35 composed of the elastic cord 20 and the wide base 50. The ends 30 and 40 of the elastic cord 20 are securely retained within the wide base 50 by a multiplicity of retaining or gripping means such as teeth. The base 50 can have a first half 52 having an outer surface 54 and an inner surface 56 and a second half 58 having an outer surface 60 and an inner surface 62. The two halves 52 and 58 come together to form an interior chamber 66 between the inner surfaces 56 and 62. By way of example only, the teeth can having a multiplicity of first teeth 61, 63 and 65 on inner surface 62 and a multiplicity of spaced apart second teeth 70, 72, 74, 76, 78 and 80 on inner surface 56. The ends of the elastic cord 30 and 40 are placed within the interior chamber 66 of wide base 50 and the two halves 52 and 58 brought together to enclose the ends 30 and 40. The ends can be placed so that at least one set of teeth grip into the elastic cord to more securely retain the ends of the elastic cord within the base 50.

Figure 3:
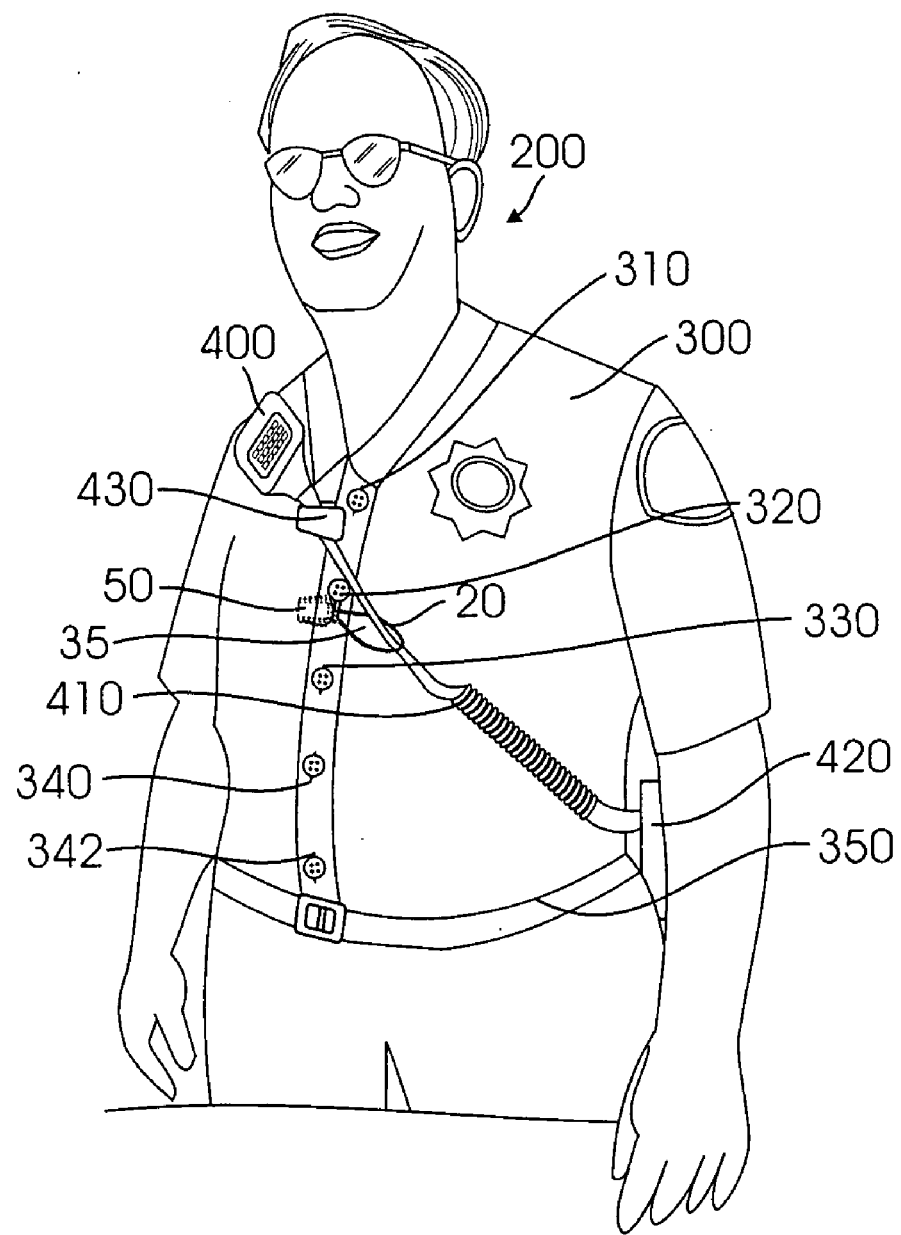
FIG. 3 is a perspective view illustrating the present invention elastic coil with a wide base in use with the coil fed through a buttonhole of a shirt and extending in front of the shirt with the wide base behind the buttonhole and the coil of a microphone extending through the elastic cord with the microphone retained on the shirt through an attachment means such as a clip.
Figure 4:
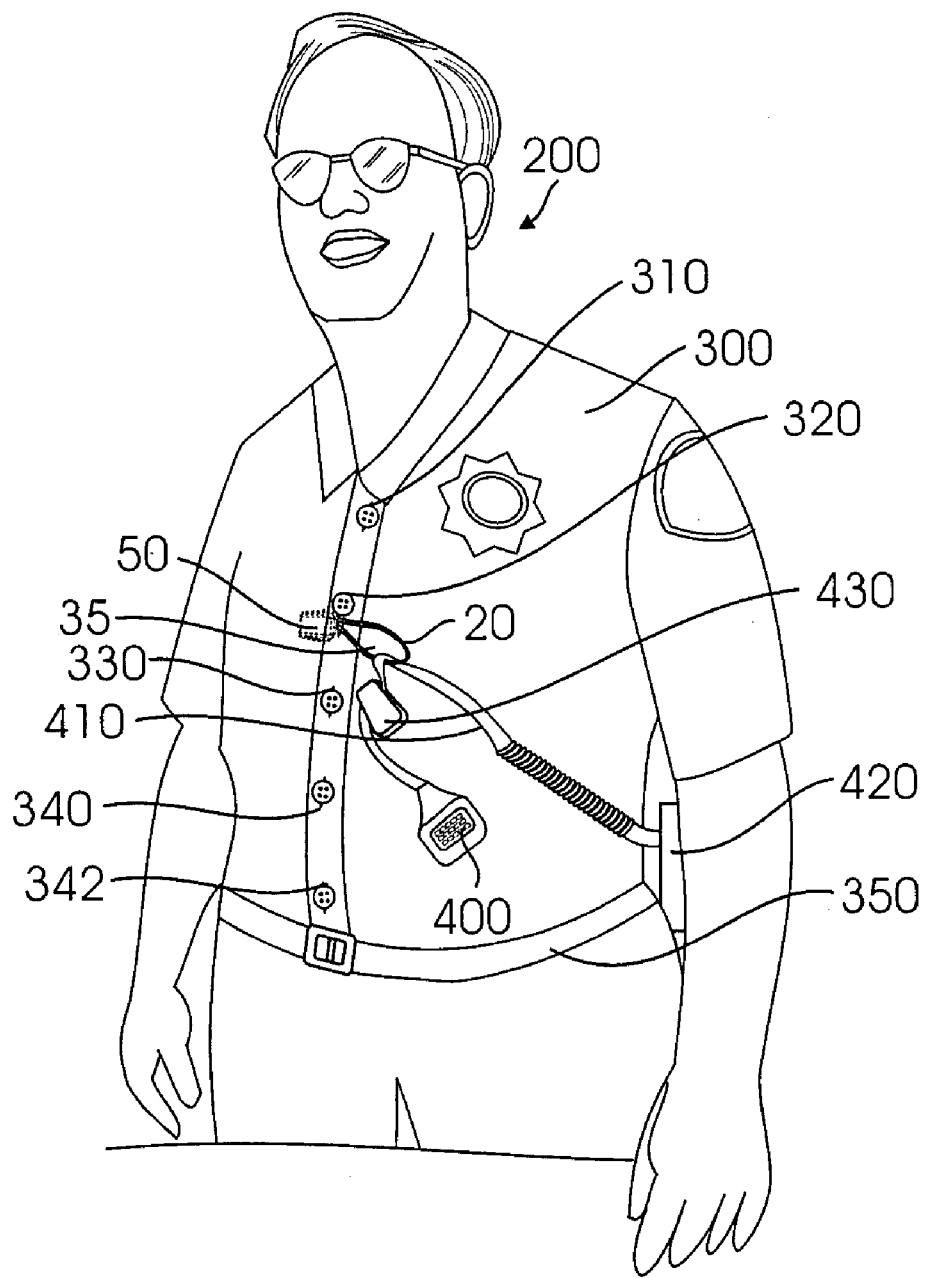
FIG. 4 is a perspective view illustrating the present invention elastic coil with a wide base in use with the coil fed through a buttonhole of a shirt and extending in front of the shirt with the wide base behind the buttonhole and the coil of a microphone extending through the elastic cord with the microphone dislodged from the shirt and dangling in front of the shirt through the elastic cord retaining the coil of the microphone.

The present invention coil retaining apparatus 10 is illustrated in use in FIGS. 3 and 4. A person such as a police officer 200 is wearing a shirt 300 having a multiplicity of buttonholes 310, 320, 330, 340 and 342. A microphone 400 is attached to a coil 410 which in turn is attached to a transmission pack 420 which is worn on the officer's belt 350. The microphone 400 is attached to the shirt 300 by attaching means 430 which by way of example is an alligator clip.

The coil retaining apparatus 10 is fed through one buttonhole such as 320 so that the closed loop 35 of elastic coil 20 protrudes in front of the shirt 300 while the wide base 50 rests behind the buttonhole 320. As a result, the coil retaining apparatus 10 is securely retained on the shirt because the wide base 50 prevents the coil retaining apparatus 10 from being pulled through the buttonhole. Before being attached to the transmission pack 430, the coil 410 is fed through the closed loop 35 of the coil retaining means 10 as illustrated in FIG. 3 and then the microphone 400 is attached to the shirt by attaching means 430.

If the police officer 300 is involved in a foot chase and is running after a felon and/or is involved in a scuffle with a felon, it is easy for the attaching means or clip 430 to be dislodged from the shirt 300 and then the microphone is dislodged. As illustrated in FIG. 4, the dislodged microphone will dangle in front of the shirt 300 in the location of the officer's chest because the coil 410 of the microphone 400 is retained by the coil retaining apparatus 10. Therefore, the microphone 400 is still within easy grasp of the police officer and will not fall on the ground.

The present invention provides significant safety for the police officer since it assures that the microphone will still be available to the police officer to enable the police officer to call for backup or other help.

While an elastic cord 20 is preferred, it will be appreciated that any flexible elongated member can be used with the present invention.

Defined broadly, the present invention is an apparatus for use by a person wearing a shirt having at least one buttonhole and a front, the person also having a microphone which has a coil connecting the microphone to a transmission pack worn by the person, the microphone removably attached to the shirt by attaching means, the apparatus comprising: (a) an elastic cord having a first end and a second end; (b) a wide base member comprised of a first half having an outer surface and an inner surface and a second half having an outer surface and an inner surface, each inner surface having a multiplicity of gripping teeth, the two halves coming together to form an interior chamber between their respective inner surfaces; (c) the first and second end of the elastic cord retained within the interior chamber of the wide base member so as to form a closed loop formed by the elastic cord and the wide base; and (d) the elastic cord is fed through the at least one buttonhole in the shirt so that the closed loop rests in front of the shirt and the wide base member rests behind the buttonhole to prevent the elastic cord from being pulled through the shirt, and the coil of the microphone is fed through the closed loop.

Defined more broadly, the present invention is an apparatus for use by a person wearing a shirt having at least one buttonhole and a front, the person also having a microphone which has a coil connecting the microphone to a transmission pack worn by the person, the microphone removably, attached to the shirt by attaching means, the apparatus comprising: (a) an elastic cord having a first end and a second end; (b) a wide base member comprised of an exterior surface surrounding an interior chamber having gripping means therein; (c) the first and second end of the elastic cord retained within the interior chamber of the wide base member so as to form a closed loop formed by the elastic cord and the wide base member; and (d) the elastic cord is fed through the at least one buttonhole in the shirt so that the closed loop rests in front of the shirt and the wide base rests behind the buttonhole to prevent the elastic cord from being pulled through the shirt, and the coil of the microphone is fed through the closed loop.

Defined even more broadly, the present invention is an apparatus for use by a person wearing a shirt having at least one buttonhole and a front, the person also having a microphone which has a coil connecting the microphone to a transmission pack worn by the person, the microphone removably attached to the shirt by attaching means, the apparatus comprising: (a) a flexible elongated member; (b) a wide base member comprised of an exterior surface surrounding an interior chamber having gripping means therein; (c) the flexible elongated member partially retained within the interior chamber of the wide base member so as to form a closed loop formed by the flexible elongated member and the wide base member; and (d) the flexible elongated member is fed through the at least one buttonhole in the shirt so that the closed loop rests in front of the shirt and the wide base member rests behind the buttonhole to prevent the flexible elongated member from being pulled through the shirt, and the coil of the microphone is fed through the closed loop.

Of course the present invention is not intended to be restricted to any particular form or arrangement, or any specific embodiment, or any specific use, disclosed herein, since the same may be modified in various particulars or relations without departing from the spirit or scope of the claimed invention hereinabove shown and described of which the apparatus or method shown is intended only for illustration and disclosure of an operative embodiment and not to show all of the various forms or modifications in which this invention might be embodied or operated.

What is claimed is:

1. An apparatus combination with a shirt having at least one buttonhole and a front, and also in combination with a microphone which has a coil connecting the microphone to a transmission pack, the microphone removably attached to the shirt by attaching means, the shirt to be worn by a person and the transmission pack to be worn by the person, the combination apparatus:
   a. an elastic cord having a first end and a second end;
   b. a wide base member comprised of a first half having an outer surface and an inner surface and a second half having an outer surface and an inner surface, each inner surface having a multiplicity of gripping teeth, the two halves coming together to form an interior chamber between their respective inner surfaces;
   c. the first and second end of the elastic cord retained within the interior chamber of the wide base member so as to form a closed loop formed by the elastic cord and the wide base; and
   d. the elastic cord extending through the at least one buttonhole in the shirt so that the closed loop rests in front of the shirt and the wide base member rests behind the buttonhole to prevent the elastic cord from being pulled through the buttonhole, and the coil of the microphone extending through the closed loop to enable the microphone to dangle adjacent the shirt when the attaching means by which the microphone is attached to the shirt becomes dislodged from the shirt.

2. The apparatus in accordance with claim 1 wherein at least some of the gripping teeth extend through at least one end of the elastic coil.

3. An apparatus combination with a shirt having at least one buttonhole and a front, and also in combination with a microphone which has a coil connecting the microphone to a transmission pack, the microphone removably attached to the shirt by attaching means, the shirt to be worn by a person and the transmission pack to be worn by the person, the combination apparatus:
   a. an elastic cord having a first end and a second end;
   b. a wide base member comprised of an exterior surface surrounding an interior chamber having gripping means therein;
   c. the first and second end of the elastic cord retained within the interior chamber of the wide base member so as to form a closed loop formed by the elastic cord and the wide base member; and
   d. the elastic cord extending through the at least one buttonhole in the shirt so that the closed loop rests in front of the shirt and the wide base member rests behind the buttonhole to prevent the flexible elongated member from being pulled through the buttonhole, and the coil of the microphone extending through the closed loop to enable the microphone to dangle adjacent the shirt when the attaching means by which the microphone is attached to the shirt becomes dislodged from the shirt.

4. The apparatus in accordance with claim 3 wherein at least some of the gripping means within the wide base member extend through at least one end of the elastic coil.

5. An apparatus combination with a shirt having at least one buttonhole and a front, and also in combination with a microphone which has a coil connecting the microphone to a transmission pack, the microphone removably attached to the shirt by attaching means, the shirt to be worn by a person and the transmission pack to be worn by the person, the combination apparatus:
   a. a flexible elongated member;
   b. a wide base member comprised of an exterior surface surrounding an interior chamber having gripping means therein;
   c. the flexible elongated member partially retained within the interior chamber of the wide base member so as to form a closed loop formed by the flexible elongated member and the wide base member; and
   d. the flexible elongated member extending through the at least one buttonhole in the shirt so that the closed loop rests in front of the shirt and the wide base member rests behind the buttonhole to prevent the flexible elongated member from being pulled through the buttonhole, and the coil of the microphone extending through the closed loop to enable the microphone to dangle adjacent the shirt when the attaching means by which the microphone is attached to the shirt becomes dislodged from the shirt.

6. The apparatus in accordance with claim 5 wherein the flexible elongated member is an elastic cord.

7. The apparatus in accordance with claim 6 wherein at some of the gripping means within the wide base member extend through at least a portion of the flexible elongated member.

* * * * *